United States Patent [19]

Kabasawa et al.

[11] Patent Number: 5,064,982
[45] Date of Patent: Nov. 12, 1991

[54] ELECTRIC RESISTANCE SEAM WELDING METHOD

[75] Inventors: Makoto Kabasawa, Yokosuka; Ono Moriaki, Yokohama, both of Japan

[73] Assignee: Nippon Kokan Kabushiki Kaisha, Tokyo, Japan

[21] Appl. No.: 394,143

[22] Filed: Aug. 16, 1989

Related U.S. Application Data

[63] Continuation of Ser. No. 104,534, Sep. 30, 1987, which is a continuation of Ser. No. 885,564, filed as PCT JP84/00583 Dec. 10, 1984, published as WO86/03442 Jun. 19, 1986, abandoned.

[51] Int. Cl.$^5$ ............................................. B23K 1/16
[52] U.S. Cl. ...................................... 219/64; 219/81
[58] Field of Search ................................. 219/81–83, 219/64, 118–120

[56] References Cited

U.S. PATENT DOCUMENTS 4,160,892  7/1979  Opprecht et al. ................. 219/83
4,334,138  6/1982  Matsuno et al. .................. 219/83

FOREIGN PATENT DOCUMENTS 5860480  2/1981  Australia .
23753    2/1981  European Pat. Off. .
56-33184 4/1981  Japan ................................ 219/84
57-33110 7/1982  Japan .
2056349  3/1981  United Kingdom .

Primary Examiner—Leo P. Picard
Assistant Examiner—Lincoln Donovan
Attorney, Agent, or Firm—Fleit, Jacobson, Cohn, Price, Holman & Stern

[57] ABSTRACT

An electric resistance seam welding method for a hard-to-weld steel sheet is disclosed which prevents the occurrence of flashes. The steel sheet has metal harder than tin and an intermetallic compound as coating layers, the sheet thickness of the steel sheet is 0.5 mm or less and portions of the sheet are overlapped for welding with an overlapping width in a range from 2.0 times to 2.3 times the sheet thickness.

1 Claim, 3 Drawing Sheets

ELECTRIC RESISTANCE SEAM WELDING METHOD

This application is a continuation of application Ser. No. 07/104,534, filed Sept. 30, 1987, which is a continuation of application Ser. No. 06/885,564, filed as PCT/JP84/00583 Dec. 10, 1984, published as WO86/03442 Jun. 19, 1986, now abandoned.

TECHNICAL FIELD

This invention relates to a welding method which increases the range of proper welding currents in the electric resistance seam welding of can bodies using materials which are hard to weld such as tin-free steel.

BACKGROUND ART

In view of the recent diversification of can-manufacturing methods for food containers, electric resistance seam welding methods such as a copper wire resistance seam welding method, etc., have been developed considerably as can-manufacturing methods.

As shown in FIG. 1, the copper wire resistance seam welding method is a method in which the longitudinal edge portions of a can shell sheet (1) preliminarily formed into a cylindrical form are passed, while being overlapped each other to a predetermined width, through a copper wire (2) wrapped round a pair of roller electrodes (3) which are arranged one upon another and at this time the application of pressure and the passage of current through the overlapped portions of the can shell sheet (1) are effected by the top and bottom roller electrodes (3) through the copper wire (2) thereby effecting the welding continuously by the heat generated by the electric resistance of the overlapped portions.

Here, as shown in FIG. 2, a guide bar (4) having a cross-sectional shape lime Z is used and the longitudinal edge portions of the can shell (1) are inserted into the guide slots of the guide bar 4 thereby overlapping them. This overlapping width is determined by the Z-shaped guide bar (4) for overlapping the longitudinal edge portions and can-shell bore determining rolls arranged around the top and bottom roller electrodes (3).

The quality of the weld zone is evaluated in terms of the bonding strength, hermetic sealing properties and external appearance properties of the seam weld zone. The bonding strength and the hermetic sealing properties are problems which have bearing on the leakage of the contents and to satisfy these characteristics it is essential that the heat generated by the electric resistance at the seam interface is greater than a certain limit value. For this reason, a minimum value of the welding current is determined. Also, as regards the external appearance properties, it is essential that there is no flash. While the seam weld is usually covered with a protective coating after the welding, the presence of any flash impedes the application of the coating or it produces an exposed portion which is not covered with the coating and moreover the use of such can shell has the danger of not only causing the contents to deteriorate as a result of this reaction with the flash but also causing the flash to fall off the can shell and enter into the contents. The flash is formed by the molten metal scattered from the seam weld and sticked to therearound. In order to prevent the presence of any flash, it is essential that the heat generated by the electric resistance at the seam interface is less than a certain limit value. Thus, a maximum value of the welding current is determined.

If the minimum and maximum values of the welding current which are determined in consideration of the bonding strength, hermetic sealing properties and external appearance properties for evaluating the quality of the seam weld are respectively defined as a lower limit current value and an upper limit current value, the value obtained by subtracting the lower limit current value from the upper limit current value represents a range of positive values for a range of proper current values for the welding and the quality of weldability of a material for container is determined by the extent of its range of proper current values.

The steel materials for containers used with this welding method are required that they are not only excellent in these performances required for sheet steels for containers such as corrosion resistance, workability and coating properties but also excellent in weldability.

While the steel materials for containers have heretofore consisted mainly of the tin plates (the weights of tin coating are 2.8 g/m$^2$ or over) for soldered cans, new materials (steel materials) have recently been developed. Where these materials are used as objects of the electric resistance seam welding method, the tin plates used for soldered cans and a part of the lightly-coated or washed tin plates have large ranges of proper current values and they are very excellent in weldability. However, the remainder of the lightly-coated tin plates and the tin-free steels are small in the range of proper welding current values and low in weldability as compared with the tin plates for soldered cans.

The tin-free steel tends to produce flashes during the welding and a reduction in the welding current value for preventing the formation of flashes tends to make the seam strength and the adhesion properties unsatisfactory.

Therefore, it has been the practice in the past to perform the electric resistance seam welding after the surface coating on the blank edge portions forming the overlaping portions have been preliminarily removed by mechanical means such as a wire brush thus substantially exposing the steel surface wholly. However, the use of such mechanical means increases the operating steps by one step and moreover the scraped fine particles are not removed completely from the surface of the steel sheet and stick again thus giving rise to various inconveniences during the subsequent operations. Also, there are disadvantages that the exposed steel surface subsequent to the removal of the surface coating has no corrosion resistance, that its external appearance is deteriorated and so on. As a result, the tin-free steel has not been used for the manufacture of cans for canned food as yet.

It is an object of the present invention to provide an electric resistance seam welding method which overcomes the foregoing deficiencies and by which materials for food containers which are difficult to be subjected to electric resistance welding such as the tin-free steel can be easily welded without requiring any special preliminary treatment.

DISCLOSURE OF INVENTION

The present invention relates to an electric resistance seam welding method for steel sheets which are hard to weld and the steel sheets include metals harder than tin and intermetallic compounds as coating layers, have sheet thicknesses within a range which is ordinarily usable as materials for cans, i.e., 0.5 mm or less and have overlapping widths in a range from 2.0 times to 2.3 times the sheet thicknesses of the steel sheets. This fact has the effect of increasing the range of proper welding currents for the steel sheets, preventing the occurrence of flashes and improving the weldability.

(1) . . . can shell sheet, (2) . . . copper wire, (3) . . . roller electrode, (4) . . . Z-shaped guide bar, (5) . . . base metal, (6) . . . coating of metallic chromium, (7) . . . coating of hydrated chromium oxide, (8) . . . welding current path, (9) . . . molten metal, (10) . . . flash, (a) . . . lower limit current value, (b) . . . upper limit current value, (c) . . . range of proper current values.

BEST MODE FOR CARRYING OUT THE INVENTION

With a view to solving the problems encountered in the welding of materials which are difficult to weld, the inventors have attempted to elucidate the weldability from the standpoint of welding phenomena. As a result, the following have been made clear.

In the case of the tin plate for soldered cans which is excellent in weldability, despite the fact that the conversion formed coating of hydrated chromium oxide is an electric insulating material, the tin of the primary coat is so soft that the conversion formed coating is easily destroyed and broken out under the pressure applied by the electrodes and a large current passing area is obtained. Thus, a uniform electric resistance heat generation takes place at the seam interface so that a high temperature softened zone is obtained over a satisfactorily wide extent prior to the formation of molten metal and the pressure welding is effected at the seam interface due to a large plastic flow thus producing an excellent seam.

Figure 1:
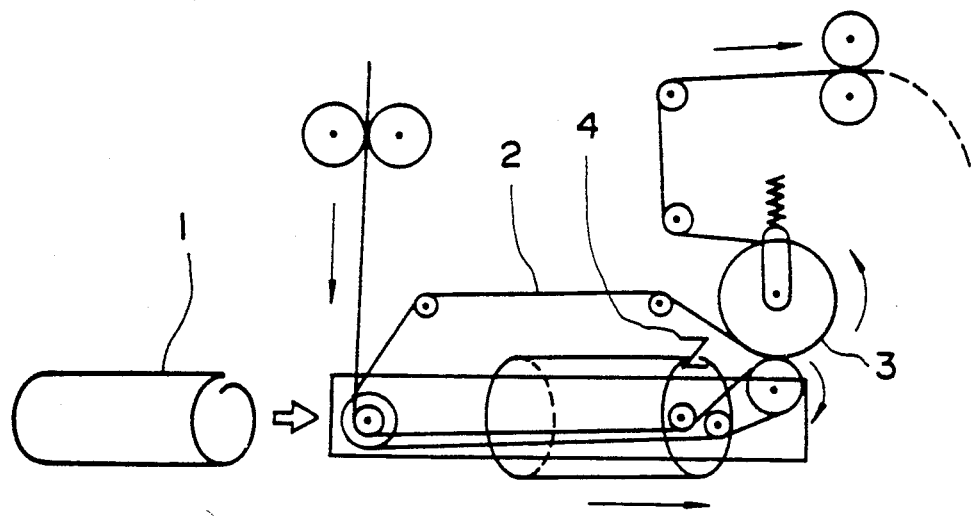
FIG. 1 is a diagram for explaining a copper wire resistance seam welding method.
Figure 2:
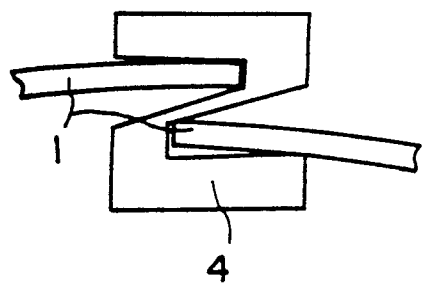
FIG. 2 is a diagram for explaining the Z-shaped guide bar of the copper wire resistance seam welding method of FIG. 1.
Figure 3:
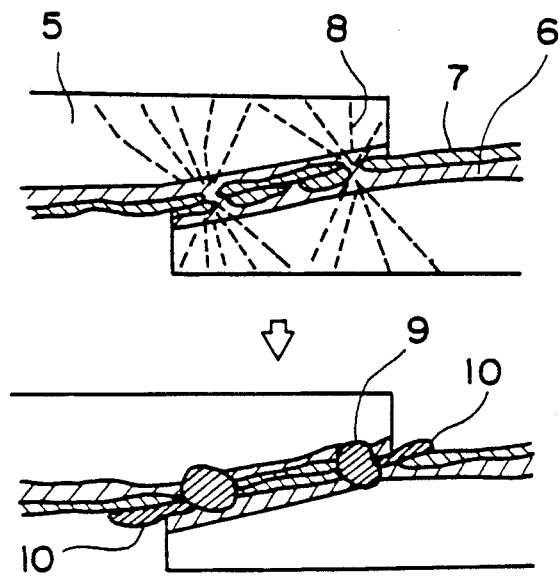
FIG. 3 shows diagrams for explaining the welding conditions of the seam weld of a tin-free steel.

On the other hand, in the case of the tin-free steel, as the seam weld forming conditions schematically shown in FIG. 3, metallic chromium (6) underneath a conversion formed coating (7) is very hard as compared with tin so that the breaking of the conversion formed coating due to the pressure application by the electrodes is not sufficient and during the welding the current flows in a localized manner and nonuniformly. As a result, molten metal (9) is formed at a relatively low current value. However, since the high-temperature softened zone is not formed sufficiently and the shut-up effect in shape of the molten metal due to the plastic flow is low and the molten metal is easily scattered thus forming flashes (10). However, it has been found that the bonding strength and the hermetic sealing properties can be produced relatively easily by a localized joining.

Measures heretofore taken for improving the weldability of hard-to-weld materials have mainly consisted of reducing the weight of the conversion formed coating (the amount of metallic chromium, the amount of hydrated chromium oxide) on the surface of the materials so as to prevent the formation of molten metal due to the localized generation of heat.

As the result of the above-mentioned elucidation of the welding phenomena, the inventors of this invention have considered that increasing the force tending to prevent the scattering of molten metal can be an effective means of improving the weldability of the hard-to-weld materials and have made studies on the rationalization of the seam weld shape (the overlapping width).

The overlapping widths used in the past have been 0.4 mm, 0.6 mm and 0.8 mm or over and the weldabilities resulting from the use of these overlapping widths are as mentioned below. For instance, where a tin-free steel having a material sheet thickness of 0.22 mm is used, if the overlapping width is 0.4 mm, the resulting seam weld overlapping allowance is too small as compared with the material sheet thickness and the effect of preventing the scattering of molten metal is reduced thus deteriorating the weldability. If the overlapping width is 0.6 mm, the resulting overlapping allowance is excessively large and the force per unit area is decreased, with the result that the formation of molten metal due to the localized heat generation is promoted and also the force for preventing the molten metal from scattering is reduced thus making it impossible to obtain an excellent seam.

While the existence of a certain range of proper values for the overlapping width is presumed, in order to improve the weldability, generally there is the tendency to make the overlapping width smaller than 0.4 mm in the belief that it is advantageous to decrease the seam weld overlapping allowance. However, to decrease the overlapping width is not advantageous in that the force for preventing the molten metal from scattering is decreased.

It has been found that in accordance with the invention the weldability is improved remarkably by selecting the ratio of the overlapping ratio to the material sheet thickness in a range from 2.0 times to 2.3 times.

Figure 4:
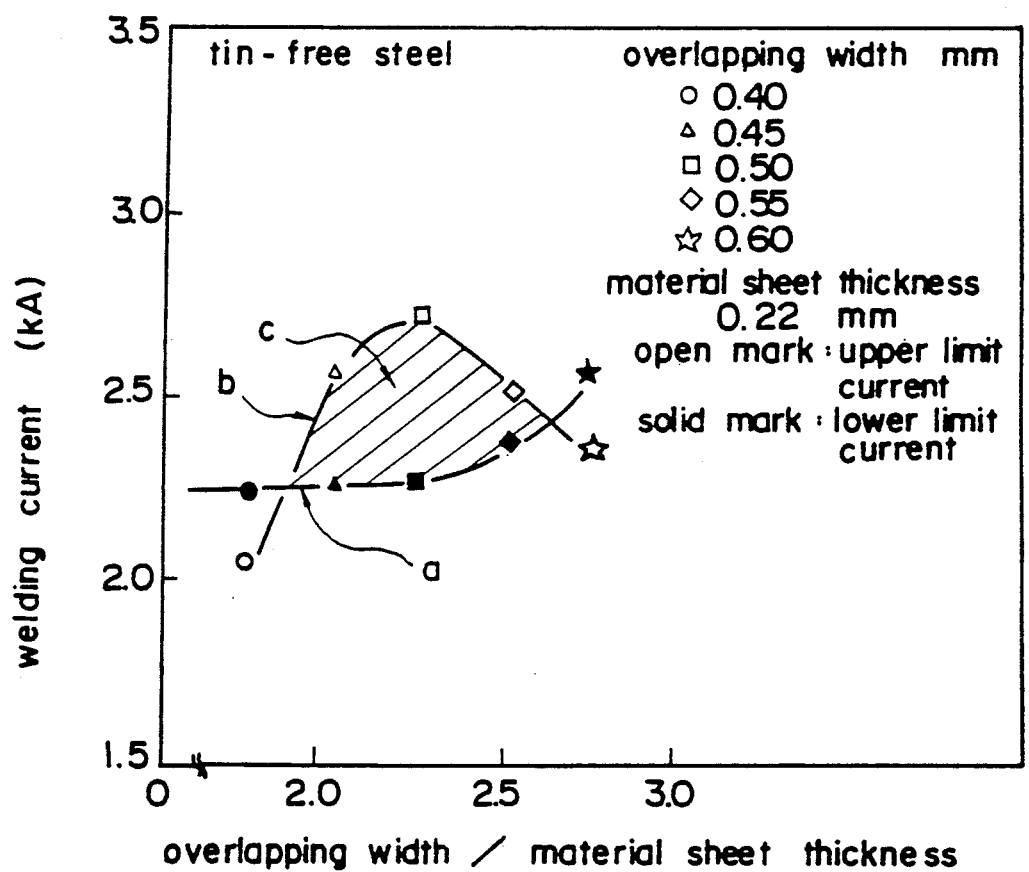
FIGS. 4 and 5 are characteristic diagrams each showing the relation between the ratio of the overlapping width to the material sheet thickness and the welding current with respect to the tin-free steel.

In other words, using tin-free steels (having a metalic chromium weight of 150 mg/m$^2$ and a chromium weight of 30 mg/m$^2$ in hydrated chromium oxide) made of blank sheets having a material sheet thickness of 0.22 mm and a degree of temper T-4, their weldabilities were examined by welding them by the copper wire resistance seam welding method with a welding speed of 45 m/min, electrode welding pressure of 40 kgf and overlapping widths of 0.4 mm, 0.45 mm, 0.5 mm, 0.55 mm and 0.6 mm. As a result, the data shown in FIG. 4 were obtained. FIG. 4 shows the relation between the ratio of the overlapping width to the material sheet thickness and the lower limit current a and upper limit current b of the welding current. In FIG. 4, the area c enclosed by the lower limit currents a and the upper limit currents b represents a range of proper currents.

Thus, it has been found that in the case of the tin-free steel which has heretofore been considered to be impossible to weld, by controlling the ratio of the overlapping width to the material sheet thickness in a range from 2.0 times to 2.3 times, it is possible to obtain a sufficiently wide proper current range, i.e., at least 300 A and over in consideration of the external factors.

Also, since the welding occurs in the high temperature portion where the resistance to distortion is decreased and since it is considered that the quality of the welding is affected by both the seam weld shape and the temperature distribution and that the temperature distribution is dependent on the material sheet thickness, the adequacy of the applicable range of the material sheet thicknesses with respect to the above-mentioned proper overlapping widths have been investigated thus obtaining the results shown in the following Table 1.

TABLE 1

| Material sheet thickness mm | Overlapping width, mm | | | | |
|---|---|---|---|---|---|
|  | 0.40 | 0.45 | 0.50 | 0.55 | 0.60 |
| T F S 0.21 | 2.22 x | 2.50 o | 2.78 o | 3.06 x | 3.33 x |
| T F S 0.22 | 1.82 x | 2.05 o | 2.27 o | 2.5 Δ | 2.73 x |
| T F S 0.27 | 1.67 x | 1.88 x | 2.08 x | 2.29 Δ | 2.50 Δ |

In Table 1, the materials TFS are chromium-type tin-free steel. In the Table, the figures represent the ratios of the overlapping widths to the material sheet thicknesses and the results of the weldability evaluations are indicated by marks of o, Δ and x. The marks o show the cases where the proper current range is 300 A and over and the weldability is excellent, the marks Δ the cases where the proper current range is from 0 A to 300 A and the weldability is fairly good and the marks x the cases where the proper current range is negative and the weldability is bad.

As a result, it has been found that the proper range of material sheet thicknesses to which the welding method is applicable is from 0.2 mm to 0.25 mm.

Table 2 shows the results of the welding tests on various materials having a material sheet thickness of 0.22 mm and welded by the copper wire resistance seam welding method with an electrode welding force of 40 kgf.

TABLE 2

| Material | Overlapping width, mm | Upper limit current, A | Lower limit current, A | Proper current range, A | Overlapping width/material sheet thickness |
|---|---|---|---|---|---|
| E2.8/2.8 |  | 4100 | 3100 | 1000 |  |
| L T S |  | 3250 | 2800 | 450 |  |
| Ni-plated |  | 3200 | 2650 | 550 |  |
| T F S | 0.45 | 2560 | 2250 | 310 | 2.05 |
| E2.8/2.8 |  | 4250 | 3200 | 1050 |  |
| L T S | 0.50 | 3400 | 2850 | 550 | 2.27 |
| Ni-plated |  | 3300 | 2750 | 550 |  |
| T F S |  | 2700 | 2260 | 440 |  |
| E2.8/2.8 | 0.55 | 4150 | 3350 | 800 | 2.50 |
| L T S |  | 2950 | 2900 | 50 |  |
| Ni-plated |  | 2800 | 2800 | 0 |  |
| T F S |  | 2500 | 2380 | 120 |  |
| E2.8/2.8 |  | 3500 | 3050 | 450 |  |

TABLE 2-continued

| Material | Overlapping width, mm | Upper limit current, A | Lower limit current, A | Proper current range, A | Overlapping width/material sheet thickness |
|---|---|---|---|---|---|
| L T S | 0.40 | 2700 | 2750 | 0 | 1.82 |
| Ni-plated |  | 2550 | 2600 | 0 |  |
| T F S |  | 2060 | 2250 | 0 |  |
| E2.8/2.8 |  | 3700 | 3400 | 300 |  |
| L T S | 0.60 | 2850 | 2950 | 0 | 2.73 |
| Ni-plated |  | 2800 | 2850 | 0 |  |
| T F S |  | 2350 | 2550 | 0 |  |

The materials used in this welding include soldered-can tin plates LTS having a tin-coating weight of 0.55 g/m$^2$, nickel-plated steel sheets and chromium-type tin-free steels TFS. Then, in all the cases where the ratio of the overlapping width to the material sheet thickness is from 2.0 times to 2.3 times, each of the materials shows a sufficiently wide range of proper welding currents.

Figure 5:
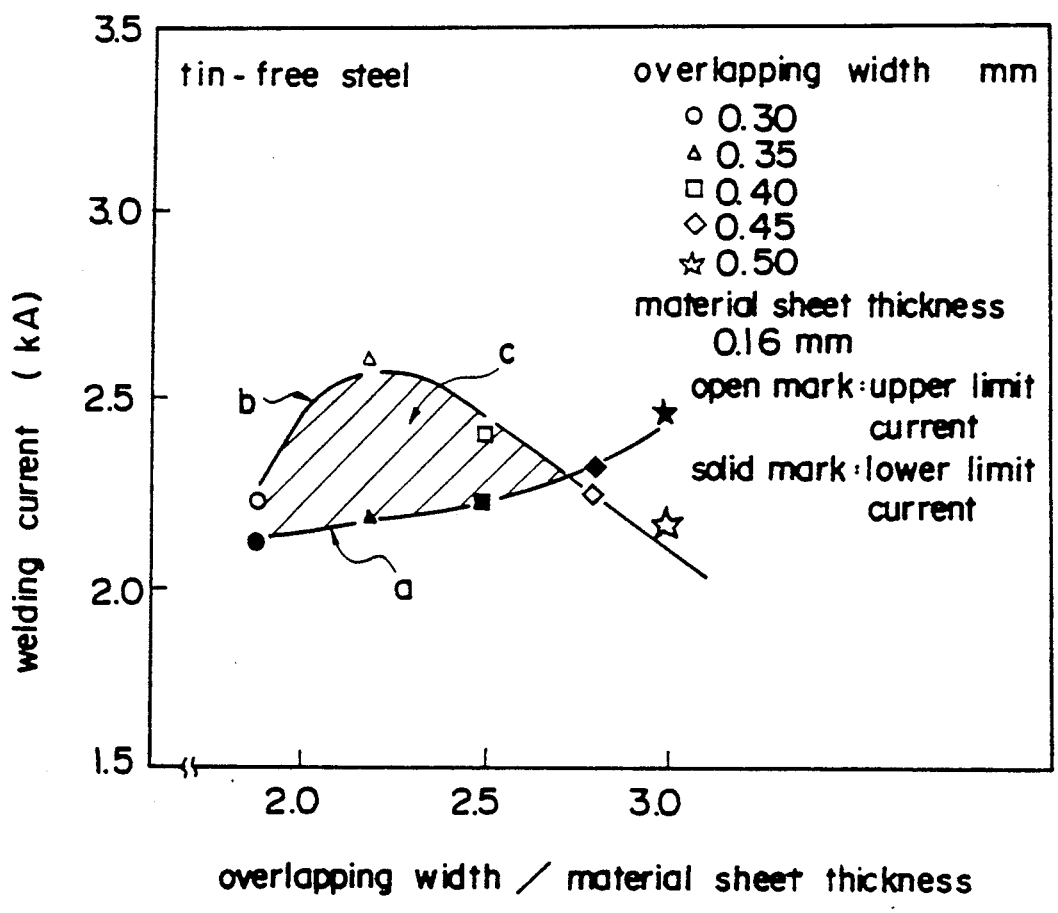

Then, it is considered that the quality of the welding is affected by the seam weld shape and the electrode welding force. Noting the fact that an increase in the electrode welding force greatly contributes toward improving the weldability, welding tests were performed by increasing the electrode welding force from 40 kgf to 50 kgf, using tin-free steels of 0.16 mm in material sheet thickness and selecting overlapping widths of 0.3 mm, 0.35 mm, 0.40 mm, 0.45 mm and 0.5 mm thus obtaining the results shown in FIG. 5. As in FIG. 4, FIG. 5 shows the relation between the ratio of the overlapping width to the material sheet thickness and the lower limit current a and the upper limit current b of the welding current and the area c enclosed by the lower limit currents a and the upper limit currents b represents a proper current range. Also in this case, a sufficiently wide range of proper welding currents is obtainable if the overlapping width is from 2.0 times to 2.3 times.

Then, welding tests were performed by varying the material sheet thickness over a wide range and the range of application of material sheet thicknesses was examined. The results obtained are shown in Table 3.

TABLE 3

| Material Sheet Thickness, mm | Overlapping width, mm | | | | | | | | | |
|---|---|---|---|---|---|---|---|---|---|---|
|  | 0.35 | 0.40 | 0.45 | 0.50 | 0.55 | 0.60 | 0.70 | 0.80 | 0.90 | 1.00 |
| T F S 0.16 | 2.19 o | 2.50 Δ | 2.81 x | 3.13 x | 3.44 x | 3.75 x | 4.38 x | 5.00 x | 5.63 x | 6.25 x |
| T F S 0.18 | 1.94 Δ | 2.22 0 | 2.50 Δ | 2.78 x | 3.05 x | 3.33 x | 3.89 x | 4.44 x | 5.00 x | 5.56 x |
| T F S 0.22 | 1.59 x | 1.82 x | 2.05 o | 2.27 o | 2.50 Δ | 2.73 x | 3.18 x | 3.64 x | 4.09 x | 4.55 x |
| T F S 0.32 | 1.09 x | 1.25 x | 1.41 x | 1.56 x | 1.72 Δ | 1.88 o | 2.19 o | 2.50 Δ | 2.81 x | 3.13 x |
| T F S 0.40 | 0.88 x | 1.00 x | 1.13 x | 1.25 x | 1.38 x | 1.50 x | 1.75 x | 2.00 Δ | 2.25 o | 2.50 Δ |
| T F S 0.45 | 9.78 x | 0.89 x | 1.00 x | 1.11 x | 1.22 x | 1.33 x | 1.56 x | 1.78 x | 2.00 Δ | 2.22 o |

In Table 3, the materials TFS are chromium-type tin-free steels. In the Table, the figures show the ratios of the overlapping widths to the material sheet thicknesses and the results of the weldability evaluations are indicated by marks of o, Δ and x. The marks o show the cases where the proper current range is 300 A and over and the weldability is excellent, the marks Δ the cases where the proper current range is from 0 A to 300 A and the marks x the cases where the proper current range is negative and the weldability is bad.

As a result, it has been found that the improved weldability is confirmed for all of the material sheet thicknesses which are usually used as materials for cans, i.e., material sheet thicknesses of 0.5 mm or less if the steel sheet overlapping width is from 2.0 times to 2.3 times the material sheet thickness. In other words, it has been found that the improvement of weldability is not dependent on the material sheet thickness if the ratio between the overlapping width and the material sheet thickness of the steel sheet is within the above-mentioned range.

If electric resistance heat generation of materials for containers is localized and nonuniform as compared with the tin plates for soldered cans, these materials are considered to be low in weldability as compared with the tin plates for soldered cans. For instance, it is known that the weldability of the materials is decreased if the plating metal is harder than tin or the conversion coating is thick and the present invention is effective for all of such materials.

Table 4 shows the results of welding tests on different materials having material sheet thicknesses of 0.16 mm, 0.22 mm and 0.32 mm and welded by the copper wire resistance seam welding method.

The materials used in this welding include TFS. Here, in the cases where the ratio of the overlapping width to the material sheet thickness is in the range from 2.0 times to 2.3 times, each of the materials shows a sufficiently wide range of proper currents.

INDUSTRIAL APPLICABILITY

As described hereinabove, the electric resistance seam welding method of this invention is useful in increasing the proper current ranges of materials which are hard to weld and the method is suitable for manufacturing welded cans from the hard-to-weld materials such as tin-free steels which have heretofore been not used for cans of canned food.

What is claimed is:

1. An electric resistance seam welding method for surface treated steel sheet having a surface layer of a metal harder than tin and a metallic compound, said steel sheet having a sheet thickness of 0.5 mm or less and said steel sheet being provided with overlapped portions of a predetermined overlapping width for welding, the improvement comprising a step of determining said overlapping width within a range from 2.0 times to 2.3 times said sheet thickness.

* * * * *

TABLE 4

| Material | Overlapping width, mm | Material sheet thickness mm | Overlapping width/material thickness mm | Upper limit current, A | lower limit current, A | Proper current range, A |
| --- | --- | --- | --- | --- | --- | --- |
| E2.8/2.8 |  |  |  | 4050 | 3100 | 950 |
| LTS | 0.35 | 0.16 | 2.19 | 3200 | 2700 | 500 |
| Ni-plated |  |  |  | 3170 | 2650 | 520 |
| TFS |  |  |  | 2610 | 2190 | 420 |
| E2.8/2.8 |  |  |  | 4250 | 3200 | 1050 |
| LTS | 0.50 | 0.22 | 2.27 | 3400 | 2850 | 550 |
| Ni-plated |  |  |  | 3300 | 2750 | 550 |
| TFS |  |  |  | 2750 | 2280 | 470 |
| E2.8/2.8 |  |  |  | 4150 | 3400 | 750 |
| LTS | 0.70 | 0.32 | 2.19 | 3430 | 3020 | 410 |
| Ni-plated |  |  |  | 3685 | 2980 | 405 |
| TFS |  |  |  | 2730 | 2410 | 320 |